(12) United States Patent
Stanga et al.

(10) Patent No.: US 9,234,063 B2
(45) Date of Patent: Jan. 12, 2016

(54) PERFLUOROELASTOMER

(75) Inventors: Milena Stanga, Origgio (IT); Claudia Manzoni, Bologna (IT); Margherita Albano, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 389 days.

(21) Appl. No.: 13/148,094

(22) PCT Filed: Feb. 8, 2010

(86) PCT No.: PCT/EP2010/051505
§ 371 (c)(1),
(2), (4) Date: Aug. 5, 2011

(87) PCT Pub. No.: WO2010/092021
PCT Pub. Date: Aug. 19, 2010

(65) Prior Publication Data
US 2011/0294938 A1 Dec. 1, 2011

(30) Foreign Application Priority Data
Feb. 13, 2009 (EP) .................................... 09152864

(51) Int. Cl.
*C08L 27/22* (2006.01)
*C08F 8/00* (2006.01)
*C08F 214/26* (2006.01)

(52) U.S. Cl.
CPC ........... *C08F 214/26* (2013.01); *C08F 214/262* (2013.01)

(58) Field of Classification Search
USPC ................................ 524/546; 525/326.3, 387
See application file for complete search history.

(56) References Cited

U.S. PATENT DOCUMENTS

| | | | |
|---|---|---|---|
| 4,035,565 A * | 7/1977 | Apotheker et al. | 526/249 |
| 4,243,770 A | 1/1981 | Tatemoto et al. | |
| 4,281,092 A | 7/1981 | Breazeale | |
| 4,564,662 A | 1/1986 | Albin | |
| 4,694,045 A * | 9/1987 | Moore | 525/276 |
| 4,745,165 A | 5/1988 | Arcella et al. | |
| 4,789,717 A | 12/1988 | Giannetti et al. | |
| 4,864,006 A | 9/1989 | Giannetti et al. | |
| 4,943,622 A | 7/1990 | Naraki et al. | |
| 5,919,878 A * | 7/1999 | Brothers et al. | 526/247 |

FOREIGN PATENT DOCUMENTS

| | | | |
|---|---|---|---|
| EP | 633274 A1 * | 1/1995 | |
| EP | 661304 A1 | 7/1995 | |
| EP | 1308467 A2 * | 10/2002 | |
| EP | 1308467 A2 * | 5/2003 | |
| EP | 1457505 A1 * | 9/2004 | |
| EP | 1621558 A2 | 2/2006 | |
| EP | 1626068 A1 | 2/2006 | |
| JP | H04-505345 A | 9/1992 | |
| JP | 09255732 | 9/1997 | |
| JP | 2002265733 A | 9/2002 | |
| WO | WO 90/14368 A1 | 11/1990 | |
| WO | WO 9502634 A1 | 1/1995 | |
| WO | WO 9823653 A1 | 6/1998 | |
| WO | WO-2007/096347 A1 * | 8/2007 | |
| WO | WO-2007/096347 A1 * | 9/2007 | |
| WO | WO 2008003634 A1 | 1/2008 | |
| WO | WO 2008003635 A1 | 1/2008 | |
| WO | WO 2008003636 A1 | 1/2008 | |

OTHER PUBLICATIONS

Standard ASTM D1646, "Standard Test Methods for Rubber—Viscosity, Stress Relaxation, and Pre-Vulcanization Characteristics (Mooney Viscometer)", 2007, pp. 1-12; 12 pgs.

* cited by examiner

*Primary Examiner* — Peter D Mulcahy
*Assistant Examiner* — Henry Hu
(74) *Attorney, Agent, or Firm* — Arent Fox LLP

(57) ABSTRACT

A peroxide curable perfluoroelastomer comprising: recurring units derived from tetrafluoroethylene (TFE); and recurring units derived from perfluoromethylvinylether (MVE); such perfluoroelastomer possessing a Mooney Viscosity (ML2+9) at 121° C. of from 25 to 140 MU, when measured according to ASTM D1646 standard, and comprising such MVE recurring units in an amount of from 26 to 33% by moles with respect to total moles of TFE and MVE. A process for the manufacture of such perfluoroelastomer, and cured articles obtainable therefrom.

4 Claims, No Drawings

PERFLUOROELASTOMER

CROSS-REFERENCE TO RELATED APPLICATIONS

This application is a U.S. national stage entry under 35 U.S.C. §371 of International Application No. PCT/EP2010/051505 filed Feb. 8, 2010, which claims priority to European Application No. 09152864.6 filed Feb. 13, 2009, the whole content of this application being herein incorporated by reference for all purposes.

TECHNICAL FIELD

This invention pertains to certain perfluoroelastomer having improved thermal resistance, to a process for their manufacture, and to the cured articles obtainable therefrom.

BACKGROUND ART

Fluoroelastomer are synthetic rubbers designed for demanding service applications in hostile environments, endowed with outstanding chemical and thermal resistance.

Perfluoroelastomers having fully fluorinated fluorinated backbones and typically based on copolymers of tetrafluoroethylene (TFE) and perfluoromethylvinylether (MVE), optionally comprising recurring units derived from cure-site containing monomers, represent in this domain top-edge class of materials, introduced into the market since late sixties.

Generally these TFE/MVE copolymers have roughly a 60/40 mol/mol to 65/35 composition, which enables achievement of required elastomeric behaviour; such copolymers generally also comprise recurring units derived from monomers comprising curing sites and/or end groups contemplating such cure sites. Typically, peroxide curing is preferred technique used for their vulcanization and moulding.

Despite their availability since over 30 years, there is still a continuous need for further improving performances of these materials. Thermal resistance at high temperatures is, among other, a continuous filed of endeavour in the development of novel perfluoroelastomers.

DISCLOSURE OF INVENTION

It is thus an object of the invention a peroxide curable perfluoroelastomer comprising:
  recurring units derived from tetrafluoroethylene (TFE); and
  recurring units derived from perfluoromethylvinylether (MVE);
said perfluoroelastomer possessing a Mooney Viscosity (ML2+9) at 121° C. of 25 to 140 MU, when measured according to ASTM D1646 standard, and comprising said MVE recurring units in an amount of from 26 to 33% by moles with respect to total moles of TFE and MVE.

The Applicant has surprisingly found that when selecting this relatively low and narrow concentration of MVE recurring units in combination with a high molecular weight (hereby expressed in terms of MU), it is advantageously possible to significantly improve performances of perfluoroelastomers, in particular at temperatures exceeding 200° C.

For the purpose of the invention, the term "perfluoroelastomer" is intended to denote a fluoroelastomer substantially free of hydrogen atoms. The term "substantially free of hydrogen atom" is understood to mean that the perfluoroelastomer consists essentially of recurring units derived from ethylenically unsaturated monomers comprising at least one fluorine atom and free of hydrogen atoms [per(halo)fluoromonomer (PFM)].

Minor amounts of moieties derived from hydrogen-containing recurring units might be present provided that they do not substantially affect properties of the perfluoroelastomer. An amount not exceeding 1% moles (preferably not exceeding 0.5% moles) with respect to total moles of TFE and MVE is generally considered as fulfilling the 'perfluoroelastomer' behaviour.

The perfluoroelastomer can comprise, in addition to recurring units derived from TFE and MVE, recurring units derived from one or more per(halo)fluoromonomer (PFM).

Should the perfluoroelastomer comprises recurring units derived from a per(halo)fluoromonomer (PFM) different from TFE and MVE, these recurring units are typically comprised in an amount not exceeding 5% moles, preferably not exceeding 3% moles, with respect to total moles of TFE and MVE.

Non limitative examples of suitable per(halo)fluoromonomers (PFM) are notably:
  $C_3$-$C_8$ perfluoroolefins, such hexafluoropropene (HFP);
  bromo- and/or iodo $C_2$-$C_8$ (halo)fluoroolefins, such as bromotrifluoroethylene, iodotrifluoroethylene;
  per(halo)fluoroalkylvinylethers complying with general formula $CF_2$=$CFOR_{f3}$ in which $R_{f3}$ is a $C_2$-$C_6$ per(halo)fluoroalkyl, such as —$C_2F_5$, —$C_3F_7$, optionally comprising iodine or bromine atoms;
  per(halo)fluoro-oxyalkylvinylethers complying with general formula $CF_2$=$CFOX_{01}$, in which $X_{01}$ is a $C_1$-$C_{12}$ per(halo)fluorooxyalkyl having one or more ether groups, like perfluoro-2-propoxy-propyl group, optionally comprising iodine or bromine atoms;
  per(halo)fluoro-methoxy-alkylvinylethers complying with general formula $CF_2$=$CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$, optionally comprising iodine or bromine atoms;
  per(halo)fluorodioxoles of formula:

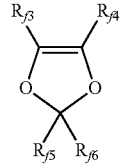

wherein each of $R_{f3}$, $R_{f4}$, $R_{f5}$, $R_{f6}$, equal of different each other, is independently a fluorine atom, a $C_1$-$C_6$ per(halo)fluoroalkyl group, optionally comprising one or more oxygen atom, e.g. —$CF_3$, —$C_2F_5$, —$C_3F_7$, —$OCF_3$, —$OCF_2CF_2OCF_3$ and optionally comprising iodine or bromine atoms; preferably a per(halo)fluorodioxole complying with formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

Optionally, the perfluoroelastomer also comprises recurring units derived from a bis-olefin of general formula (I) here below:

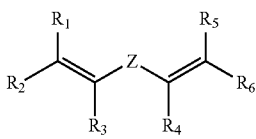

wherein:
R$_1$, R$_2$, R$_3$, R$_4$, R$_5$ and R$_6$, which may be identical or different from each other, are H or C$_1$-C$_5$ alkyl;
Z is a linear or branched C$_1$-C$_{18}$ alkylene or cycloalkylene radical, optionally containing oxygen atoms, preferably at least partially fluorinated, or a (per)fluoropolyoxyalkylene radical; these bis-olefins are described, for example, in EP 0661304 A (AUSIMONT SPA [IT]) Jul. 5, 1995.

The amount of chain units derived from these bis-olefins is generally between 0.01 and 1.0% by moles, preferably between 0.03 and 0.5 mol and even more preferably between 0.05 and 0.2% by moles with respect to the total moles of TFE and MVE recurring units.

The perfluoroelastomer of the invention is peroxide curable, that is to say that it is susceptible of being cured with the aid of peroxide radical initiators in suitable conditions and/or in combination with appropriate ingredients.

To this aim, the perfluoroelastomer of the invention typically comprises at least one of:
iodine and/or bromine atoms in the chain and/or in the end position of the macromolecules; and
recurring units derived from a cure-site monomer comprising a functional group of —CN type.

It is nevertheless generally preferred that the perfluoroelastomer of the invention comprises iodine and/or bromine atoms in the chain and/or in the end position of the macromolecules.

The perfluoroelastomer of the invention is generally free from recurring units derived from cure-site monomers comprising a —CN group.

The introduction of said iodine and/or bromine atoms in the preferred perfluoroelastomers of the invention may be performed by adding, to the reaction mixture, brominated and/or iodinated comonomers, otherwise called iodinated/brominated cure-site comonomers, so as to obtain a perfluoroelastomer containing iodine and/or bromine atoms in the chain. The perfluoroelastomer of this embodiment typically comprises, in addition to TFE and MVE recurring units, from 0.05 to 5% moles of recurring units derived from said brominated and/or iodinated comonomers.

Non limitative examples of said brominated and/or iodinated comonomers are notably:
C$_2$-C$_{10}$ bromine- and/or iodine-containing olefin, i.e. olefins in which at least one hydrogen atom has been replaced with a bromine atom or an iodine atom, respectively, and optionally, one or more of the remaining hydrogen atoms have been replaced with an atom of another halogen, preferably fluorine. Representative suitable bromine-containing olefins include bromotrifluoroethylene, 1-bromo-2,2-difluoroethylene, 4-bromo-3,3,4,4-tetrafluorobutene-1, vinyl bromide, 1-bromo-1,2,2-trifluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromo-perfluorobutene-1, and 3,3-difluoroallylbromide. Representative suitable iodine-containing olefins include compounds of the formula CH$_2$=CH(CF$_2$)$_x$I where x is 2-6, more specifically, iodoethylene, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,-2,2-tetrafluoroethylene, 1,1,2,3,3,3-hexafluoro-2-iodo-1-(perfluorovinyloxy)propane, 2-iodoethyl vinyl ether, 3,3,4,5,5,5-hexafluoro-4-iodopentene, iodotrifluoroethylene, and preferably 4-iodo-3,3,4,4-tetrafluorobutene-1. Use of these cure-site comonomers in elastomer manufacture has been notably described in U.S. Pat. No. 4,035,565 (DUPONT) Jul. 12, 1977, U.S. Pat. No. 4,694,045;

iodo- and/or bromo-containing fluorinated vinyl ethers; mention can be notably made of compounds described in U.S. Pat. No. 4,745,165 (AUSIMONT) May 17, 1988 and U.S. Pat. No. 4,564,662 (MINNESOTA MINING & MFG [US]) Jan. 14, 1986; a preferred class of these compound is notably that complying with formula CF$_2$=CF—O—R'$_f$—CX$_2$Z, wherein each of X, equal to or different from each other is H or F, Z is I or Br, and R'$_f$ is a divalent fluorocarbon group, preferably a —(CF$_2$)$_m$— group, with m=0 to 5.

As an alternative to or in combination with above mentioned iodinated/brominated cure-site comonomers, perfluoroelastomer of the invention may comprise iodine and/or bromine atoms in end-groups. These iodine and/or bromine atoms are typically introduced during manufacture of perfluoroelastomer, by polymerizing in the presence of iodinated and/or brominated chain-transfer agents. Among said chain-transfer agents mention can be made of:
(i) alkali metal or alkaline-earth metal iodides and/or bromides, and
(ii) iodine and/or bromine containing fluorocarbon compounds.

In this view, preferred iodinated and/or brominated chain-transfer agents are those of formula R$_f$(I)$_x$(Br)$_y$, where R$_f$ is a (per)fluoroalkyl or a (per)fluorochloroalkyl containing from 1 to 8 carbon atoms, while x and y are integers between 0 and 2, with 1≤x+y≤2. The use of these compounds for manufacturing fluoroelastomers is notably described in U.S. Pat. No. 4,243,770 (DAIKIN IND LTD) Jan. 6, 1981 and U.S. Pat. No. 4,943,622 (NIPPON MEKTRON KK [JP]) Jul. 24, 1990.

The perfluoroelastomer of the invention preferably consists essentially of recurring units derived from TFE and MVE, and, optionally from the bis-olefin as above detailed, and further comprises iodine and/or bromine atoms in end-groups.

It is essential that the perfluoroelastomer of the invention comprises recurring units derived from MVE in an amount of from 26 to 33% by moles with respect to total moles of TFE and MVE.

Preferred perfluoroelastomers of the invention are those consisting essentially of:
from 67 to 74% moles of recurring units derived from TFE; and
from 26 to 33% moles of recurring units derived from MVE; and
further comprising iodine and/or bromine (preferably iodine) in end-groups.

The Applicant has surprisingly found that when the perfluoroelastomer comprises more than 33% moles or less than 26% moles of recurring units derived from MVE, despite the fact that the Mooney viscosity requirement is satisfied, unacceptable sealing properties are obtained, as shown by the compression-set values detailed in the examples.

The amount of recurring units derived from MVE is preferably comprised between 28 and 32% moles, with respect to total moles of TFE and MVE.

It is also another essential requirement of the invention for the perfluoroelastomer to possess a Mooney Viscosity (ML2+9) at 121° C. comprised between 25 and 140 MU, when measured according to ASTM D1646 standard.

The Applicant has surprisingly found that when the perfluoroelastomer possesses a Mooney Viscosity outside the claimed boundaries, despite the fact that the MVE content is satisfied, unacceptable sealing properties are obtained, as shown by the compression-set values detailed in the examples.

The perfluoroelastomer possesses a Mooney Viscosity (ML2+9) at 121° C. comprised preferably between 40 and 120 MU, more preferably between 50 and 120 MU, when measured according to ASTM D1646 standard.

The preparation of the fluoroelastomer of the invention may be performed by copolymerizing the monomers in aqueous emulsion, according to methods that are well known in the art, in the presence of radical initiators (for example alkali metal or ammonium persulfates, perphosphates, perborates or percarbonates), optionally in combination with ferrous, cuprous or silver salts, or salts of other readily oxidizable metals. Surfactants of various types are usually also present in the reaction medium, among which fluorinated surfactants are more particularly preferred.

As an alternative to emulsion polymerization, the polymerization reaction to obtain the perfluoroelastomer may be performed in bulk or in suspension, in an organic liquid in which a suitable radical initiator is present, according to well-known techniques.

The polymerization reaction is generally performed at temperatures of between 25 and 150° C., at a pressure of up to 10 MPa.

The preparation of the perfluoroelastomer is preferably performed as a microemulsion of perfluoropolyoxyalkylenes, as notably described in U.S. Pat. No. 4,789,717 (AUSIMONT SPA [IT]) Dec. 6, 1988 and U.S. Pat. No. 4,864,006 (AUSIMONT SPA [IT]) Sep. 5, 1989.

The perfluoroelastomer of the present invention are typically cured via peroxide vulcanization.

The peroxide-mediated vulcanization can be performed according to known techniques, via the addition of suitable peroxide capable of generating radicals by thermal decomposition.

Curable composition comprising the perfluoroelastomer of the invention thus typically comprises at least one peroxide, preferably at least one organic peroxide.

Said peroxide is typically used in amount of 0.05 to 10%, preferably of 0.5 to 5% by weight relative to the perfluoroelastomer.

Among the most commonly used peroxides, mention may be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate.

Curable compound comprising the perfluoroelastomer of the invention can generally comprise additional ingredients, preferably selected from the group consisting of:

(a') vulcanization coagents, in an amount generally of between 0.5% and 10% and preferably between 1% and 7% by weight relative to the perfluoroelastomer;

(b') optionally, a metallic compound, in an amount of between 1% and 15% and preferably between 2% and 10% by weight relative to the polymer, preferably chosen from oxides and hydroxides of divalent metals, for instance Mg, Zn, Ca or Pb, optionally combined with a salt of a weak acid, for instance stearates, benzoates, carbonates, oxalates or phosphites of Ba, Na, K, Pb or Ca;

(c') optionally, acid acceptors of metal non-oxide type such as 1,8-bis(dimethylamino)naphthalene, octadecylamine, etc. as described in EP 708 797;

(d') optionally, other conventional additives, such as thickening fillers, preferably carbon black, silica, semicrystalline fluoropolymers consisting of TFE homopolymers or copolymers of TFE with one or more monomers containing at least one unsaturation of ethylenic type, in an amount of from 0.01 mol % to 10 mol % and preferably from 0.05 mol % to 7 mol %; pigments, antioxidants, stabilizers and the like.

Among vulcanization coagents, mention can be notably made of triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl-methyltrisiloxane, and bis-olefins of formula (I) as above detailed. In case of perfluoroelastomers comprising recurring units derived from cyano (—CN) containing monomers, aromatic polyamines compounds and/or organotin compounds can be used as vulcanization coagents.

Among polyamine compounds, mention can be notably made of compounds of formula:

$$H_2N—Ar—NH_2$$

with Ar being an aromatic group of formula:

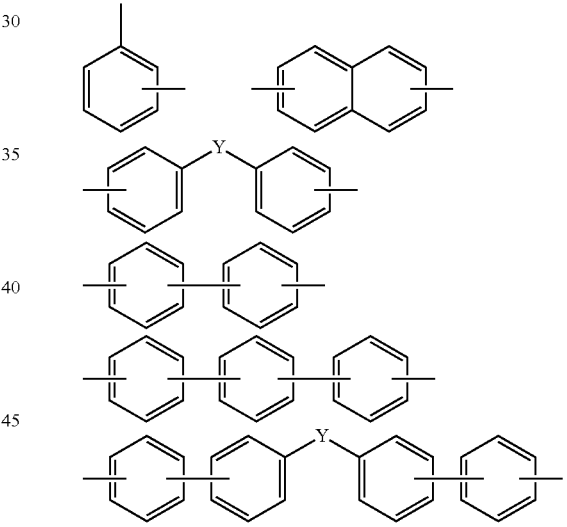

and corresponding optionally substituted structures (e.g. further comprising hydroxyl groups), with Y being —O—, —S—, —SO$_2$—, —CH$_2$—, —C(O)—, —C(CF$_3$)$_2$—, —C(CH$_3$)$_2$—, —(CH$_2$)$_n$—, —(CF$_2$)$_n$—, n being an integer from 0 to 5.

Among organotin compounds, mention can be notably made of those of formula Ar'$_x$SnY$_{4-x}$—, wherein Ar' is an aromatic group, optionally comprising condensed rings, Y is an organic group comprising a carbon-carbon double bond, preferably an allyl, allenyl, propargyl group, and x is an integer from 0 to 3.

Among thickening fillers, silica fillers are those preferred for achieving improved thermal and vapour resistance. Among those silica fillers, silica having a pH value, determined according to the DIN ISO 787-9 standard, higher than 7, and/or silica having hydrophobic behaviour are preferred. The use of these silica fillers in fluoroelastomer is notably described in WO 2008/003634 (SOLVAY SOLEXIS SPA [IT];) Jan. 10, 2008 and in WO 2008/003635 (SOLVAY SOLEXIS SPA [IT];) Jan. 10, 2008.

In cases wherein improved water vapour resistance, especially at high temperature, is sought, carbon black fillers, and more particularly, those carbon black fillers having CTAB of 25 to 35 m²/g are preferred; these fillers are notably described in WO 2008/003636 (SOLVAY SOLEXIS SPA [IT];) Jan. 10, 2008.

The invention also pertains to cured articles made from the perfluoroelastomer of the invention.

The cured articles of the invention are typically manufactured by a process comprising:
- providing a curable perfluoroelastomer composition comprising the perfluoroelastomer and the peroxide, as above detailed;
- vulcanizing-molding said composition to yield shaped pre-formed sealing articles; and
- optionally, thermally post-treating said shaped pre-formed sealing articles to yield the cured articles.

In general, the curable perfluoroelastomer composition is molded and simultaneously vulcanized using techniques such as injection-moulding or compression-moulding, or alternatively by extrusion-moulding.

While temperature at which the vulcanizing-moulding is not particularly limited, temperatures of between about 50° C. and about 250° C. and preferably between about 100° C. and about 220° C. are generally used.

The skilled in the art will thus select the appropriate curing/vulcanization recipe (peroxide, vulcanization coagents . . . ) so as to obtain appropriate curing at the selected temperature.

After vulcanization-moulding, the vulcanized shaped pre-formed sealing articles can be subjected to a subsequent thermal post-treatment step. This treatment is generally performed in suitable heating devices, generally electric ovens or convection ovens.

The thermal post-treatment is generally performed for a time from at least two minutes to 36 hours, preferably from 30 minutes to 24 hours and more preferably from 1 hour to 12 hours.

Temperature of such post-treatment is not particularly limited; it is generally understood that this post-treatment (elsewhere known as post-cure) is typically carried out at temperatures between 150 and 350° C., preferably between 200 and 300° C.

The invention will be now described in more detail with reference to the following examples whose purpose is merely illustrative and not intended to limit the scope of this invention.

EXAMPLES

General Compounding and Curing Procedure

Fluoroelastomer described below have been formulated with or without additives/ingredients mentioned in the below embedded tables; addition of said additives/ingredients has been carried out following compounding procedures described in ASTM D 3182 standard; cured specimens have been prepared following procedure described in same standard.

Determination of Mooney Viscosity

Mooney viscosity has been determined following ASTM D1646 standard, with an initial (before rotor start) heating period of the specimen of 2 minutes and a 9 minutes delay for carrying out the determination.

Determination of Mechanical and Sealing Properties on Cured Samples

Tensile properties were determined on specimens punched off from plaques, following ASTM D412 standard, method C.

M 100 is the stress in MPa for an elongation of 100%

T.S. is the stress at break in MPa;

E.B. is the elongation at break in %.

Shore A (3") hardness (HDS) has been determined according to ASTM D2240—Type A Durometer standard at 25° C.

Compression set (C-SET) has been determined on type 214 O-rings according to ASTM D329 and D1414 standards.

Example 1

In a 22-liters autoclave equipped with mechanical stirrer operating at 460 rpm, 14 liters of demineralized water and 140 ml of a microemulsion preliminarily obtained by mixing 30.5 ml of a perfluoropolyether having carboxylic end-group of formula: $CF_2ClO(CF_2-CF(CF_3)O)_n(CF_2O)_mCF_2COOH$, with n/m=10 and average molecular weight of 600 g/mol; 30.5 ml of a NH$_4$OH 30% v/v aqueous solution; 61 ml of demineralized water; 18 ml of a GALDEN® D02 perfluoropolyether of formula: $C-F_{-3}-O-(-CF_2-CF(CF_3)O)_n(CF_2O)_mCF_3$ with n/m=20 and molecular weight of 450 g/mol, were introduced Reactor was thus heated to set-point temperature of 80° C.; then 45 g of 1,4-diiodoperfluorobutane ($C_4F_8I_2$) were added, followed by a monomers mixtures having following composition: tetrafluoroethylene (TFE) 62% moles, perfluoromethylvinylether (MVE) 38% moles until a final pressure of 20 bar (2 MPa), 0.7 g of ammonium persulfate (APS) and 22 g of $CH_2=CH-(CF_2)_6-CH=CH_2$, fed in 20 portions each 5% increase in conversion. Set-point pressure of 20 bar was maintained by feeding a monomers mixture composed of TFE 66% moles, MVE 34% moles; after having fed 7.7 kg of monomers mixture (corresponding to a total reaction time of 374 minutes), reactor was cooled and a latex comprising 382 $g_{polymer}/kg_{latex}$ was recovered. Latex was then coagulated and purified under the form of a gel following procedure described in EP 1626068 A (SOLVAY SOLEXIS SPA [IT]) Feb. 15, 2006. After drying at 90° C. for 16 hours, a polymer composed of MVE 29% moles, TFE 71% moles, whose properties are summarized in Table 1 was obtained.

Example 2

Same procedure as example 1 was repeated but using 54.6 g of $C_4F_8I_2$; an initial feeding of a monomers mixtures composed of TFE 58% moles, MVE 42% moles; and a subsequent feeding of a mixture made of TFE: 65% moles; MVE: 35% moles for maintaining set-point pressure. Reaction was pursued during 225 minutes, obtaining latex having a solids content of 331 $g_{polymer}/kg_{latex}$. After coagulation as above described, a latex having composition MVE 30% moles, TFE 70% moles was obtained, whose properties are summarized in Table 1.

Example 3

Same procedure as example 1 was repeated but using 54.2 g of $C_4F_8I_2$; an initial feeding of a monomers mixtures composed of TFE 53.7% moles, MVE 46.3% moles; and a subsequent feeding of a mixture made of TFE: 64% moles; MVE: 36% moles for maintaining set-point pressure. Reaction was pursued during 225 minutes, obtaining latex having a solids content of 340 $g_{polymer}/kg_{latex}$. After coagulation as above described, a latex having composition MVE 31% moles, TFE 69% moles was obtained, whose properties are summarized in Table 1.

Example 4

Same procedure as example 1 was repeated but using 49.3 g of $C_4F_8I_2$; an initial feeding of a monomers mixtures composed of TFE 50% moles, MVE 50% moles; and a subsequent feeding of a mixture made of TFE: 62% moles; MVE: 38% moles for maintaining set-point pressure. Reaction was pursued during 279 minutes, obtaining latex having a solids content of 331 $g_{polymer}/kg_{latex}$. After coagulation as above described, a latex having composition MVE 31.5% moles, TFE 68.5% moles was obtained, whose properties are summarized in Table 1.

Example 5

Same procedure as example 1 was repeated but using 53.4 g of $C_4F_8I_2$; an initial feeding of a monomers mixtures composed of TFE 45% moles, MVE 55% moles; and a subsequent feeding of a mixture made of TFE: 63% moles; MVE: 37% moles for maintaining set-point pressure. Reaction was pursued during 247 minutes, obtaining latex having a solids content of 339 $g_{polymer}/kg_{latex}$. After coagulation as above described, a latex having composition MVE 32.0% moles, TFE 68.0% moles was obtained, whose properties are summarized in Table 1.

Example 6

Same polymer as that manufacture in example 5 was used and properties of cured compounds are summarized in Table 2.

Comparative Example 7

Same procedure as example 1 was repeated but using 41 g of $C_4F_8I_2$; an initial feeding of a monomers mixtures composed of TFE 35% moles, MVE 65% moles until a set-point pressure of 25 bar; and a subsequent feeding of a mixture made of TFE: 60% moles; MVE: 40% moles for maintaining said set-point pressure. Reaction was pursued during 187 minutes, obtaining latex having a solids content of 338 $g_{polymer}/kg_{latex}$. After coagulation as above described, a latex having composition MVE 34.0% moles, TFE 66.0% moles was obtained, whose properties are summarized in Table 2.

Comparative Example 8

Same procedure as example 1 was repeated but using an initial feeding of a monomers mixtures composed of TFE 66% moles, MVE 34% moles; and a subsequent feeding of a mixture made of TFE: 71% moles; MVE: 29% moles for maintaining said set-point pressure. Reaction was pursued during 190 minutes, obtaining latex having a solids content of 340 $g_{polymer}/kg_{latex}$. After coagulation as above described, a latex having composition MVE 24.0% moles, TFE 76.0% moles was obtained, whose properties are summarized in Table 2.

Comparative Example 9

Same procedure as example 4 was repeated but using 75 g di $C_4F_8I_2$. Properties of fluoroelastomer so obtained are summarized in Table 2.

Comparative Example 10

Same procedure as example 4 was repeated but using 28 g di $C_4F_8I_2$. Properties of fluoroelastomer so obtained are summarized in Table 2.

Example 11

Same fluoroelastomer of example 1 was used. Properties of fluoroelastomer so obtained are summarized in Table 3.

Example 12

Same fluoroelastomer of example 1 was used. Properties of fluoroelastomer so obtained are summarized in Table 3.

TABLE 1

| Run | | Ex. 1 | Ex. 2 | Ex. 3 | Ex. 4 | Ex. 5 |
|---|---|---|---|---|---|---|
| MVE | % mol | 29 | 30 | 31 | 32 | 31.5 |
| Mooney[1] | MU | 113 | 88 | 72 | 51 | 81 |
| Compound recipe | | | | | | |
| elastomer | phr | 100 | 100 | 100 | 100 | 100 |
| Bis-olefin[2] | phr | 1.5 | 1.5 | 1.5 | 1.5 | 1.5 |
| peroxide[3] | phr | 1 | 1 | 1 | 1 | 1 |
| silica[4] | phr | 15 | 15 | 15 | 15 | 15 |
| Mechanical properties[5] | | | | | | |
| TS | MPa | 22 | 19.5 | 19.1 | 21.2 | 17.6 |
| EB | % | 218 | 220 | 240 | 235 | 228 |
| HDS | Shore A | 84 | 83 | 79 | 79 | 76 |
| Compression set[6] 70 h @ 316° C. | | | | | | |
| CS | % | 25 | 39 | 38 | 38 | 38 |

[1]Mooney viscosity (2 + 9) at 121° C.;
[2]bis-olefin of formula: $CH_2=CH-(CF_2)_6-CH=CH_2$;
[3]LUPEROX ® 101XL: neat liquid 2,5-dimethyl-2,5-bis(tert-butylperoxy)hexane
[4]SIPERNAT ® silica filler commercially available from Evonik Ind.
[5]Carried out on post-cured specimens; vulcanizing-moulding and post-curing conditions: Cure: 20 min at 175° C.; post-cure: (8 + 16) h at 290° C.
[6]CS on #214 O-ring.

TABLE 2

| Run | | Ex. 6 | Ex. 7C | Ex. 8C | Ex. 9C | Ex. 10C |
|---|---|---|---|---|---|---|
| MVE | % mol | 31.5 | 34 | 24 | 32 | 32 |
| Mooney[1] | MU | 81 | 70 | 70 | 20 | 170 |
| Compound recipe | | | | | | |
| elastomer | phr | 100 | 100 | 100 | 100 | 100 |
| Bis-olefin[2] | phr | 1.5 | 1.5 | 1.5 | 1.5 | 1.5 |
| peroxide[3] | phr | 1 | 1 | 1 | 1 | 1 |
| ZnO | phr | 5 | 5 | 5 | 5 | 5 |
| CB[7] | phr | 8 | 8 | 8 | 8 | 8 |
| CB[8] | phr | 7 | 7 | 7 | 7 | 7 |
| Mechanical properties[5] | | | | | | |
| TS | MPa | 18 | 20 | 15 | 11 | 12 |
| EB | % | 175 | 180 | 190 | 190 | 120 |
| HDS | Shore A | 70 | 73 | 94 | 70 | 75 |
| Compression set[6] 70 h @ 316° C. | | | | | | |
| CS | % | 45 | 65 | 90 | 75 | 78 |

[1]-[6]same as in Table 1;
[7]Carbon black MT N 990
[8]Austin black 325 filler, commercially available from Coal Fillers Incorporated.

TABLE 3

| Run | | Ex. 11 | Ex. 12 |
|---|---|---|---|
| MVE | % mol | 29 | 29 |
| Mooney[1] | MU | 113 | 113 |
| Compound recipe | | | |
| elastomer | phr | 100 | 100 |
| Bis-olefin[2] | phr | 3 | — |
| TAIC[9] | phr | — | 3 |
| peroxide[3] | phr | 2 | 1.5 |
| Mechanical properties[10] | | | |
| TS | MPa | 24.5 | 23.1 |
| EB | % | 245 | 198 |
| HDS | Shore A | 71 | 74 |
| Compression set[11] 70 h @ 200° C. | | | |
| CS | % | 21 | 19 |

[1]-[3]same as in Table 1;
[9]TAICROS ® TAIC: liquid triallylisocyanurate commercially available from Evonik;
[10]Carried out on post-cured specimens; vulcanizing-moulding and post-curing conditions: Cure: 20 min at 160° C.; post-cure: (8 + 16)h at 230° C.
[11]CS on #214 O-ring.

Data provided here above well demonstrate that sealing properties at high temperature (as shown by compression set values) are by far improved (lower values) for perfluoroelastomers of the present invention with respect to perfluoroelastomers not complying with either of claimed requirement, i.e. not having required Mooney viscosity and/or not possessing required MVE content.

The invention claimed is:

1. A peroxide curable perfluoroelastomer consisting essentially of:
   recurring units derived from tetrafluoroethylene (TFE);
   recurring units derived from perfluoromethylvinylether (MVE);
   iodine in the end position of the macromolecules; and
   optionally recurring units derived from a bis-olefin of formula (I):

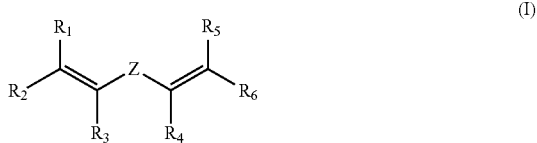

wherein:
   $R_1$, $R_2$, $R_3$, $R_4$, $R_5$ and $R_6$, which are identical or different from each other, are H or $C_1$-$C_5$ alkyl; and
   Z is a linear or branched $C_1$-$C_{18}$ alkylene or cycloalkylene radical, optionally containing oxygen atoms,
   said perfluoroelastomer possessing a Mooney Viscosity (ML2+9) at 121° C. of from 25 to 140 MU, when measured according to ASTM D1646 standard, comprising said MVE recurring units in an amount of from 26 to 33% by moles with respect to total moles of TFE and MVE, from 67 to 74% moles of recurring units derived from TFE with respect to total moles of TFE and MVE, and optionally said bis-olefin recurring units are present in an amount of from 0.01 to 1% moles with respect to total moles of TFE and MVE.

2. The perfluoroelastomer of claim 1, said perfluoroelastomer possessing a Mooney Viscosity (ML2+9) at 121° C. comprised between 40 and 120 MU, when measured according to ASTM D1646 standard.

3. A process for manufacturing the perfluoroelastomer according to claim 1.

4. Cured articles made from the perfluoroelastomer of claim 1.

* * * * *